United States Patent [19]

Rofer et al.

[11] Patent Number: 5,133,877
[45] Date of Patent: Jul. 28, 1992

[54] CONVERSION OF HAZARDOUS MATERIALS USING SUPERCRITICAL WATER OXIDATION

[75] Inventors: Cheryl K. Rofer; Steven J. Buelow; Richard B. Dyer, all of Los Alamos, N. Mex.; Joseph D. Wander, Parker, Fla.

[73] Assignee: The United States of America as represented by the United States Department of Energy, Washington, D.C.

[21] Appl. No.: 677,738

[22] Filed: Mar. 29, 1991

[51] Int. Cl.$^5$ ............................................. C02F 1/72
[52] U.S. Cl. .................................. 210/761; 210/908; 210/909; 149/124
[58] Field of Search ............... 210/761, 762, 721, 908, 210/909; 149/124

[56] References Cited

U.S. PATENT DOCUMENTS

| | | | |
|---|---|---|---|
| 3,207,572 | 9/1965 | Saul | 210/761 |
| 3,853,759 | 12/1974 | Titmas | 210/63 |
| 3,876,497 | 4/1975 | Hoffman | 210/761 |
| 3,920,506 | 11/1975 | Morgan | 210/761 |
| 4,113,446 | 9/1978 | Modell et al. | 48/202 |
| 4,338,199 | 7/1982 | Modell | 210/761 |
| 4,543,190 | 9/1985 | Modell | 210/721 |
| 4,594,164 | 6/1986 | Titmas | 210/741 |
| 4,822,497 | 4/1989 | Hong et al. | 210/721 |
| 4,861,497 | 8/1989 | Welch et al. | 210/759 |

OTHER PUBLICATIONS

LA-UR-90-1338, Steven J. Buelow et al., "Advanced Techniques For Soil Remediation: Destruction Of Propellant Components In Supercritical Water". This paper will appear in the Proceedings of the Workshop on the Alternatives to Open Burning/Open Detonation of Propellants and Explosives.
LA-11700-MS, Cheryl K. Rofer et al., "Phase II Final Report: Oxidation of Hydrocarbons and Oxygenates in Supercritical Water".

*Primary Examiner*—Stanley S. Silverman
*Assistant Examiner*—Neil M. McCarthy
*Attorney, Agent, or Firm*—Richard J. Cordovano; Paul D. Gaetjens; William R. Moser

[57] ABSTRACT

A process for destruction of hazardous materials in a medium of supercritical water without the addition of an oxidant material. The harzardous material is converted to simple compounds which are relatively benign or easily treatable to yield materials which can be discharged into the environment. Treatment agents may be added to the reactants in order to bind certain materials, such as chlorine, in the form of salts or to otherwise facilitate the destruction reactions.

2 Claims, 1 Drawing Sheet

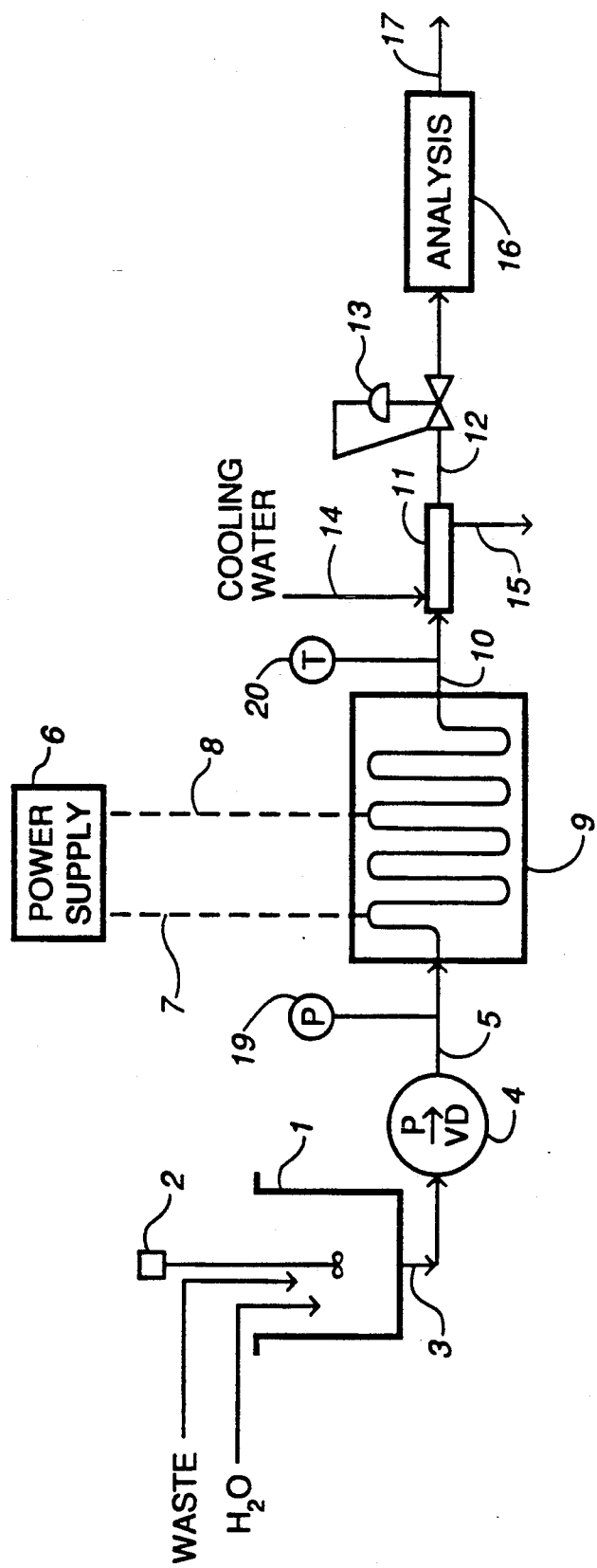

CONVERSION OF HAZARDOUS MATERIALS USING SUPERCRITICAL WATER OXIDATION

This invention is the result of a contract with the Department of Energy (Contract No. W-7405-ENG-36) and a contract with the U.S. Air Force.

BACKGROUND OF THE INVENTION

This invention relates to the fields of chemistry and reaction kinetics.

This invention was born of a need for a process to destroy explosives and gun propellants which does not pollute the atmosphere, such as do open burning and open detonation, and which does not simply transform the materials into other compounds whose safe disposal is difficult. The invention is also applicable to other types of hazardous materials.

Oxidation of waste materials with added oxygen in water which is at a temperature and pressure above its critical point (supercritical water oxidation) is known. The oxygen for the reaction is supplied in gaseous form or as a cryogenic liquid or as part of an oxygen-rich liquid such as hydrogen peroxide. The use of water above its critical point (374° C. and 3209 psia) as the medium provides a number of advantages. The solvent properties of supercritical water are different from those of liquid water in that non-polar lipophilic compounds are soluble and salts are less soluble. The majority of hazardous wastes which it is desired to destroy will be soluble in supercritical water. Because complete mixing is possible in the single-phase supercritical region, reaction kinetics are not diffusion limited. In contrast, in two-phase systems, concentration gradients across phase boundaries limit the extent to which compounds can be destroyed.

It is expected that the supercritical oxidation of the present invention will result in conversion of hazardous materials to relatively benign substances and/or to substances which are easily treatable such that they are rendered fit for ultimate disposal into the environment. The products of the inventive process are expected to be primarily CO, $CO_2$, $H_2O$, $N_2$, $N_2O$, $H_2$, and certain salts. Though oxidation in the medium of supercritical water is similar to combustion, it takes place at lower temperatures than incineration and thus is expected to produce only trace amounts of $NO_x$, thus solving the significant air pollution problem of $NO_x$ emission. Though the process will produce $N_2O$, which is a "greenhouse effect" gas, $N_2O$ is considered to be a much less serious problem than $NO_x$. In addition, $N_2O$ in the atmosphere will not tend to form $NO_x$ but will tend to break down into $N_2$ and $O_2$.

The inventive process is contained and thus its effluents can be completely controlled, in contrast to open burning. Because water is the reaction medium, the process can be used for a variety of wastes containing water or for contaminated water. There appear to be no technological upper or lower limit to the concentrations of waste material which can be destroyed. The process can be applied to difficult problems such as cleaning contaminated soil from a polluted site, destruction of armaments, such as solid fuel in a missile, and various types of radioactive waste.

SUMMARY OF THE INVENTION

This invention is a process for destruction of hazardous materials in a medium of supercritical water without the addition of an oxidant material. The hazardous material is converted to simple compounds which are relatively benign or easily treatable to yield materials which can be discharged into the environment. Treatment agents may be added to the reactants in order to bind certain materials, such as chlorine, in the form of salts or to otherwise facilitate the destruction reactions.

BRIEF SUMMARY OF THE DRAWING

The Drawing is a schematic representation of a system for destruction of hazardous waste using supercritical water oxidation.

DETAILED DESCRIPTION OF THE INVENTION

The Drawing depicts a system which may be used for supercritical waste oxidation. Only basic equipment is shown; those skilled in the art of process system design are capable of providing a system having all necessary components for efficient operation. Referring to the Drawing, waste is mixed with water in tank 1 by agitator 2. The mixture may be a slurry if the waste is not soluble in low temperature water. The mixture flows from tank 1 via conduit 3 to pump 4, where the pressure is increased to a value above the critical pressure of water. The mixture is conveyed by conduit 5 to reactor 9, which is tubing arranged in a coil. A portion of the reactor is wrapped with electrical resistance heating tape, which is used to heat the mixture in the coil to a temperature greater than the critical temperature of water. Electrical power is supplied to the heating tape by means of power supply 6 and leads 7 and 8. The mixture exits the reactor and flows via conduit 10 to heat exchanger 11 where it is cooled by water supplied to the heat exchanger by conduit 14 and removed from the heat exchanger by conduit 15. Cooled effluent from the heat exchanger flows through conduit 12 and pressure control valve 13, which maintains backpressure in the upstream components at a value above the critical pressure of water. Before being routed to final disposal means by conduit 17, the effluent is subjected to various types of analysis by equipment represented by reference number 16. Pressure sensor 19 and temperature sensor 20 are provided to monitor reaction conditions.

Experimentation was accomplished using a system similar to that of the Drawing with several different materials. A 0.1M ammonium perchlorate ($NH_4ClO_4$) solution (12 g/l) was prepared using a 0.1M NaOH solution. This mixture was raised to a pressure of 5500 psig and to several temperatures both below and above the critical temperature of water to determine at which temperatures destruction reactions would take place. Runs were made at different residence times, that is, the time intervals for which the mixture was held at the high pressure and temperatures. The results are shown in Table I. At 200° and 300° C., which are below the critical temperature, none of the $ClO_4$ was destroyed, as determined by analysis of the effluent liquid, which showed that 100% of the $ClO_4$ was present. At 400° C., slightly above the critical temperature, still none of the $ClO_4$ was destroyed. This was the case for residence times up to 330 seconds at the temperatures of 200°, 300°, and 400° C. As might be expected, a portion of the $NH_4$ was not found in the liquid effluent and, most likely, was in the gaseous portion of the effluent as $NH_3$.

At 500° C. and the relatively short residence times of 15, 30, and 60 seconds, virtually all of the $NH_4$ and $ClO_4$ were destroyed; amounts in the liquid effluent were below the levels of detection of which the analysis instruments were capable. Very little $NO_2-$ and $NO_3-$ was found in the liquid effluent. The amount of Cl which was found in the liquid as NaCl was 87% of the starting amount. The gaseous portion of the effluent was monitored for $Cl_2$ and $H_2$ and none was found. What happened to the remaining Cl is unknown. Based on known reaction kinetics of $NH_4ClO_4$ it is believed that no NOCl was formed. Though the effluent gas was not analyzed, it is believed that it was $N_2O$ or $N_2$.

TABLE I

| Temperature: 200° C. Residence Time, seconds | 83 | 165 | 330 |
|---|---|---|---|
| % $NH_4$ Recovered | 78 | 75 | 80 |
| % $ClO_4$ | 100 | 100 | 100 |
| Temperature: 300° C. Residence Time, seconds | 70 | 280 | |
| % $NH_4$ Recovered | 90 | 77 | |
| % $ClO_4$ Recovered | 100 | 100 | |
| Temperature: 400° C. Residence Time, seconds | 45 | 90 | 180 |
| % $NH_4$ Recovered | 93 | 80 | 70 |
| % $ClO_4$ Recovered | 100 | 100 | 100 |
| Temperature: 500° C. Residence Time, seconds | 15 | 30 | 60 |
| % $NH_4$ Recovered | <0.1 | <0.1 | <0.1 |
| % $ClO_4$ Recovered | <0.2 | <0.2 | <0.1 |
| % Cl Recovered as $Cl^-$ | 87 | 87 | — |
| % N Recovered as $NO_2^-$ | <0.2 | <0.2 | — |
| % N Recovered as $NO_3^-$ | 1.9 | 1.9 | — |

In summary, it is believed that the ammonium perchlorate was destroyed without producing hazardous and undesirable substances ($Cl_2$, NOCl, $NO_x$, nitrates, nitrites) and producing gaseous and liquid effluents which need none or little additional treatment. NaOH added to the reactants was a treatment agent whose purpose was to combine with the Cl to produce NaCl.

Nitromethane ($CH_3NO_2$) was subjected to supercritical oxidation at 5500 psig; the results are shown in Table II. The concentration of $CH_3NO_2$, which is slightly soluble in water, in the mixture which was raised to a pressure and temperature above the critical conditions for water, was 0.16M (10 g/l). At 400° C., 84% of the $CH_3NO_2$ was destroyed in 3 minutes. At 500° C. and 15 seconds residence time, 8% of the nitromethane is unreacted and present in the liquid effluent, but at the same temperature and longer residence times, the unreacted amount is below the limit of detection of the analysis equipment which was used. Increasing the water and nitromethane temperature to 580° C. resulted in very rapid destruction. Very little or no nitrate or nitrite was found in the liquid effluent; the concentrations were not detectable with the equipment used for analysis. Though the gaseous effluent was not analyzed in the experiments run to date, it is expected that it consisted of one or more gases from a group consisting of $N_2$, CO, $CO_2$, $N_2O$, and $H_2$. If it is desirable to dissolve the nitromethane, which is a liquid at some temperatures, or to disperse it in the water, a treatment agent of liquid $CO_2$ might be added to the reaction mixture.

TABLE II

| Temperature: 400° C. Residence Time seconds | 45 | 90 | 180 |
|---|---|---|---|
| % $CH_3NO_2$ Recovered | 57 | 43 | 16 |
| Temperature: 500° C. Residence Time seconds | 15 | 30 | 60 |
| % $CH_3NO_2$ Recovered | 8 | <1 | <1 |
| % N as $NO_2^-$ | — | — | <0.2 |
| % N as $NO_3^-$ | — | — | <0.2 |

TABLE II-continued

| Temperature: 580° C. Residence Time seconds | 9.4 | 19 | 38 |
|---|---|---|---|
| % $CH_3NO_2$ Recovered | <1 | <1 | <1 |
| % N as $NO_2^-$ | <0.2 | — | — |
| % N as $NO_3^-$ | <0.2 | — | — |

A solution of the explosive HMX (1,3,5,7-tetranitro-1,3,5,7-tetraazacyclooctane) dissolved in methylethylketone was mixed with the water in ppm amounts and the mixture (HMX is relatively insoluble) was raised to supercritical conditions of above 500° C. and above 4500 psia. The chemical formula of HMX is $C_4N_8O_8H_8$. Only very small amounts of $NO_2-$ and $NO_3-$ were found in the liquid effluent from the reactor. It is believed that the products of the reactions which took place were one or more of the compounds in a group consisting of CO, $CO_2$, $H_2O$, $N_2$, and $N_2O$.

Pentaerythritol tetranitrate (PETN) in water was subjected to supercritical conditions with the same results as with HMX. The chemical formula of PETN is $C(CH_2ONO_2)_4$. Ferrocyanide in water was tested; no HCN was detected in the effluent gas and none of the starting compound was found in the liquid effluent.

We believe that it is necessary to use a temperature above about 500° C. and a pressure above about 4500 psia to destroy most substances; using supercritical water which is not above those pressures and temperatures may not be effective. Also, it may be that the water is participating in the reaction; other research has not indicated this and it has been believed that the water has been only a medium for the reactions.

Where a hazardous material is deficient in oxygen, that is, is a predominantly reducing material, it may be combined with a predominately oxidizing hazardous material and then the mixture can be raised to supercritical conditions for destruction. The reactions which take place in the supercritical water are primarily exothermic. Should an endothermic reaction be necessary to destroy a waste, the waste can be combined with compounds whose reactions are exothermic.

To destroy explosives using the invention will require testing to determine that the explosives can be safely handled in the steps prior to destruction in the reactor.

Hastelloy C-276 was the material of construction of the reactor and 316 stainless steel was used for other components. Effluents were checked for metals. The only potential corrosion problem which was noted was that ammonium perchlorate destruction resulted in higher values of metals in the effluent. This must be further investigated.

Treatment agents will be added to the reaction mixtures to interact with materials as necessary, such as NaOH to neutralize mineral acids.

What is claimed is:

1. A method of treating hazardous materials containing organic contaminants without adding an oxidant material to the hazardous material, wherein the chemical elements comprising said organic contaminants are caused to rearrange into molecules of chemical compounds which are benign and/or easily treatable, and wherein said chemical elements comprising said organic contaminants contain an amount of oxygen effective for said rearrangement to take place, said method comprising:

a. mixing said hazardous materials with water to form a mixture;

b. increasing the temperature of said mixture to a value above about 500° C. and increasing the pressure to a value above about 4500 psig;
c. holding said mixture at said temperature and pressure for a period of time sufficient for said rearrangement to take place; and
d. cooling said mixture comprising said benign and/or easily treatable compounds.

2. The method of claim 1 wherein a first hazardous material comprising organic contaminants having an amount of oxygen insufficient to effect said rearrangement is admixed with a second hazardous material comprising organic contaminants having an amount of oxygen effective to permit rearrangement of said organic contaminants in said first and second hazardous materials into molecules of chemical compounds which are benign and/or easily treatable.

* * * * *